United States Patent
Potkonjak

(10) Patent No.: US 9,547,642 B2
(45) Date of Patent: Jan. 17, 2017

(54) VOICE TO TEXT TO VOICE PROCESSING

(75) Inventor: Miodrag Potkonjak, Los Angeles, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1226 days.

(21) Appl. No.: 12/486,446

(22) Filed: Jun. 17, 2009

(65) Prior Publication Data
US 2010/0324894 A1  Dec. 23, 2010

(51) Int. Cl.
G10L 15/26 (2006.01)
G10L 13/00 (2006.01)
G06F 17/28 (2006.01)

(52) U.S. Cl.
CPC .......... G06F 17/289 (2013.01); G10L 13/00 (2013.01); G10L 15/26 (2013.01)

(58) Field of Classification Search
CPC .... G10L 15/26; G10L 15/18; G10L 2015/088; G06F 17/30867
USPC ................... 704/231, 235, 258, 260
See application file for complete search history.

(56) References Cited

U.S. PATENT DOCUMENTS

| | | | |
|---|---|---|---|
| 4,523,055 A | 6/1985 | Hohl et al. | |
| 4,595,980 A | 6/1986 | Inned | |
| 5,231,670 A | 7/1993 | Goldhor et al. | |
| 5,712,901 A | 1/1998 | Meermans | |
| 5,715,466 A | 2/1998 | Flanagan et al. | |
| 5,751,957 A | 5/1998 | Hiroya et al. | |
| 5,850,627 A | 12/1998 | Gould et al. | |
| 6,081,780 A * | 6/2000 | Lumelsky | 704/260 |
| 6,173,250 B1 * | 1/2001 | Jong | 704/3 |
| 6,366,882 B1 * | 4/2002 | Bijl et al. | 704/235 |
| 6,421,425 B1 | 7/2002 | Bossi et al. | |
| 6,542,200 B1 * | 4/2003 | Barcy et al. | 348/468 |
| 6,687,339 B2 | 2/2004 | Martin | |
| 6,721,697 B1 * | 4/2004 | Duan et al. | 704/9 |

(Continued)

OTHER PUBLICATIONS

Ahmad et al., "Learning a spelling error model from search query logs," Oct. 6-8, 2005, Proceedings of the conference on Human Language Technology and Empirical Methods in Natural Language Processing, Vancouver, Canada, pp. 955-962.

(Continued)

Primary Examiner — Matthew Baker
(74) Attorney, Agent, or Firm — Turk IP Law, LLC

(57) ABSTRACT

Technologies are generally described for voice to text to voice processing. An audio signal can be preprocessed and translated into text prior to being processed in the textual domain. The text domain processing or subsequent text to voice regeneration can seek to improve clarity, correct grammar, adjust vocabulary level, remove profanity, correct slang, alter dialect, alter accent, or provide other modifications of various oral communication characteristics. The processed text may be translated back into the audio domain for delivery to a listener. The processing at each stage may be driven by a set of objectives and constraints set by the speaker, the listener, a third party, or any combination of explicit or implicit participants. The voice processing may translate the voice content from a specific human language to the same human language with various improvements. The processing may also involve translation into one or more other languages.

7 Claims, 5 Drawing Sheets

(56) References Cited

U.S. PATENT DOCUMENTS

| | | | |
|---|---|---|---|
| 6,778,949 B2* | 8/2004 | Duan et al. ...................... | 704/2 |
| 6,930,235 B2 | 8/2005 | Sandborn et al. | |
| 7,047,191 B2* | 5/2006 | Lange et al. .................. | 704/235 |
| 7,124,082 B2* | 10/2006 | Freedman ...................... | 704/260 |
| 7,164,753 B2 | 1/2007 | Engelke et al. | |
| 7,340,040 B1 | 3/2008 | Saylor et al. | |
| 7,359,849 B2* | 4/2008 | Palmquist ......................... | 704/5 |
| 7,483,832 B2* | 1/2009 | Tischer ......................... | 704/260 |
| 7,584,104 B2* | 9/2009 | Schroeter ...................... | 704/258 |
| 7,689,245 B2* | 3/2010 | Cox et al. .................. | 455/550.1 |
| 8,045,054 B2* | 10/2011 | Bishop et al. ................. | 348/468 |
| 8,126,697 B1* | 2/2012 | Manroa et al. ................... | 704/2 |
| 8,204,182 B2* | 6/2012 | Da Palma et al. ......... | 379/88.14 |
| 8,290,779 B2* | 10/2012 | Hoefelmeyer et al. .... | 704/270.1 |
| 8,527,280 B2* | 9/2013 | Boesen ......................... | 704/277 |
| 2002/0022498 A1* | 2/2002 | Hokao .......................... | 455/556 |
| 2003/0115068 A1* | 6/2003 | Boesen ......................... | 704/277 |
| 2004/0049389 A1* | 3/2004 | Marko et al. ................. | 704/260 |
| 2004/0073423 A1* | 4/2004 | Freedman ...................... | 704/235 |
| 2004/0267527 A1* | 12/2004 | Creamer et al. ............. | 704/235 |
| 2005/0075857 A1* | 4/2005 | Elcock et al. .................... | 704/2 |
| 2005/0086702 A1* | 4/2005 | Cormack et al. ............. | 725/135 |
| 2005/0144012 A1* | 6/2005 | Afrashteh et al. ............ | 704/277 |
| 2005/0171758 A1* | 8/2005 | Palmquist ......................... | 704/4 |
| 2006/0095262 A1* | 5/2006 | Danieli ......................... | 704/251 |
| 2006/0167992 A1* | 7/2006 | Cheung ................. | G06F 17/241 709/204 |
| 2006/0256130 A1* | 11/2006 | Gonzalez ...................... | 345/619 |
| 2007/0016401 A1* | 1/2007 | Ehsani et al. .................... | 704/9 |
| 2007/0088547 A1* | 4/2007 | Freedman ...................... | 704/235 |
| 2007/0244688 A1* | 10/2007 | Bangalore et al. .............. | 704/3 |
| 2008/0052069 A1* | 2/2008 | Flanagan et al. ............. | 704/235 |
| 2008/0134012 A1* | 6/2008 | Kokes et al. ................. | 715/201 |
| 2008/0168312 A1* | 7/2008 | Banks et al. .................... | 714/39 |
| 2010/0070578 A1* | 3/2010 | Singer et al. ................. | 709/204 |
| 2010/0082326 A1* | 4/2010 | Bangalore et al. .............. | 704/3 |
| 2010/0131260 A1* | 5/2010 | Bangalore et al. .............. | 704/3 |
| 2010/0332217 A1* | 12/2010 | Wintner et al. ................... | 704/9 |

OTHER PUBLICATIONS

Brill et al., "An improved error model for noisy channel spelling correction," Oct. 3-6, 2000, Proceedings of the 38th Annual Meeting on Association for Computational Linguistics, Hong Kong, p. 286-293.

Deller et al., Discrete Time Processing of Speech Signals, Prentice Hall PTR, Upper Saddle River, NJ, 1993. ToC.

Aldezabal et al., "Designing spelling correctors for inflected languages using lexical transducers," Jun. 8-12, 1999, Proceedings of the ninth conference on European chapter of the Association for Computational Linguistics (EACL '99), Bergen, Norway, pp. 265-266.

Arons, B. "SpeechSkimmer: interactively skimming recorded speech," Dec. 1993, ACM symposium on User interface software and technology, pp. 187-196.

Bookstein, et al., "Adapting measures of clumping strength to assess term-term similarity," May 2003, Journal of the American Society for Information Science and Technology, v.54 n. 7, p. 611-620.

Degen et al., "Working with audio: intearating personal tape recorders and desktop computers," May 1992, Proceedings of the SIGCHI conference on Human factors in computing systems, pp. 413-418. Abstract.

Fellbaum et al. Wordnet: An Electronic Lexical Database. MIT Press, Boston, MA, 1998, Abstract.

Gayer et al., "Effective sounds in complex systems: the ARKOLA simulation," Apr. 1991, SIGCHI conference on Human factors in computing systems: Reaching through technology, pp. 85-90.

Jelinek, F. Statistical Methods for Speech Recognition, MIT Press Cambridge, MA, 1998. Abstract.

Kain et al., "Spectral voice conversion for text-to-speech synthesis," May 1998, IEEE International Conference on Acoustics, Speech and Signal Processing, vol. 1, pp. 285-288.

Karat et al., "Patterns of entry and correction in large vocabulary continuous speech recognition systems," May 1999, Proceedings of the SIGCHI conference on Human factors in computing systems: the CHI is the limit, pp. 568-575.

Kurhila, S. "Correction in talk between native and non-native speaker," Jul. 2001, Journal of pragmatics, 33(7): 1083-1110. Abstract.

Lee, Kai-Fu. Automatic Speech Recognition: The Development of the Sphinx Recognition System, Kluwer Academic Publishers, Norwell, MA, 1989. Abstract.

Li, Janhua, et al., "Combining trigram and auomatic weight distribution in Chinese spelling error correction", Nov. 2002, Journal of Computer Science and Technology, 17(6): 915-923.

Lin et al., "A 1000-word vocabulary, speaker-independent, continuous live-mode speech recognizer implemented in a single FPGA," Feb. 2007, ACM/SIGDA Symposiurnon Field programmable gate arrays, pp. 60-68.

Lines et al., "Older adults' evaluations of speech output" Jul. 2002, ACM conference on Assistive technologies, pp. 170-177.

Marx et al., "Putting people first: specifying proper names in speech interfaces," Nov. 1994, ACM symposium on User interface software and technology, pp. 29-37.

Mihalcea, R., "Word sense disambiguation with pattern learning and automatic feature selection, " Dec. 2002, Natural Language Engineering, 8(4): 343-358.

Miller, G., "WordNet: a lexical database for English," Nov. 1995, Communications of the ACM, 38(11): 39-41.

Moldovan et al., "Logic form transformation of WordNet and its applicability to question answering," Jul. 6-11, 2001, Proceedings of the 39th Annual Meeting on Association for Computational Linguistics, Toulouse, France, p. 402-409.

Munteanu, et al., "The effect of speech recognition accuracy rates on the usefulness and usability of webcast archives," Apr. 2006, SIGCHI conference on Human Factors in computing systems.

Nakamura et al., "A real-time 64-monosyllable recognition LSI with learning mechanism," Jan. 2001, Proceedings of the ASP-DAC Asia South Pacific design automation, pp. 31-32.

Pentland, et al. "Modeling and prediction a human behavior," Neural Computation, v.11 n. 1, pp. 229-242, Jan. 1999.

Picone, "Signal modeling techniques in speech recognition," Sep. 1993, Proceedings of the IEEE, 81(9): 1215-1247.

Rabiner et al. Fundamentals of speech recognition. Prentice-Hall, Inc., Upper Saddle River, NJ, 1993. Abstract.

Resnick, P. "Phone-based CSCW: tools and trials," Oct. 1993, ACM Transactions on Information Systems (TOIS), 11(4): 401-424. Abstract.

Whittaker, S. et al. Semantic speech editing, SIGCHI conference on Human factors in computing systems, pp. 527-534, Apr. 2004.

Whittaker, S., SCANMail: a voicemail interface that makes speech browsable, readable and searchable, SIGCHI conference on Human factors in computing systems: Changing our world, changing ourselves, Apr. 2002.

Sawhney et al., "Nomadic radio: speech and audio interaction for contextual messaging in nomadic environments," Sep. 2000, ACM Transactions on Computer-Human Interaction (TOCHI), 7 (3): 353-383.

Schmandt, "Phoneshell: the telephone as computer terminal," Aug. 1993 ACM international conference on Multimedia, pp. 373-382.

Shneiderman, B. "The limits of speech recognition," Sep. 2000, Communications of the ACM, v.43 n. 9, pp. 63-65.

Starner, T. "The Role of Speech Input in Wearable Computing," Dec. 10, 2002, IEEE Pervasive Computing, 1 (3,): 89-93. Abstract.

Suhm, et al., "Multimodal error correction for speech user interfaces," Mar. 2001, ACM Transactions on Computer-Human Interaction (TOCHI), v.8 n. 1, pp. 60-98.

Tamura et al., "Text-To-Speech Synthesis with Arbitrary Speaker's Voice from Average Voice," Sep. 2001, European Conference on Speech Communication and Technology, 4 pages.

Tierney et al. Representation and the Text, Re-Framing the Narrative Voice. SUNY, New York, NY, 1997. Abstract.

(56) References Cited

OTHER PUBLICATIONS

Toutanova et al., "Pronunciation modeling for improved spelling correction," Jul. 7-12, 2002, Proc. of the 40th Annual Meeting on Assoc. for Computational Linguistics, Philadelphia, Pennsylvania, 8 pages.
Wilkie et al., "System-initiated digressive proposals in automated human-computer telephone dialogues: the use of contrasting politeness strategies," Jan. 2005, International Journal of Human-Computer Studies, 62(1): 41-71. Abstract.
Stamey T. E., "The Role of Speech Input in Wearable Computing," IEEE Pervasive Computing, vol. 1, No. 3, Jul. 2002, pp. 89-93.
Oviatt S., "Taming Recognition Errors with a Multimodal Interface," Communications of the ACM, vol. 43, No. 9, Sep. 2000, pp. 45-51.
Sutton S., "Universal Speech Tools: The CSLU Toolkit," 5th International Conference on Spoken Language Processing Nov. 1998.
Karen Kukich., "Technique for Automatically Correcting Words in Text," ACM Computing Surveys (CSUR), vol. 24, No. 4, pp. 377-439, Dec. 1992.
Beskow, J., "Rule-Based Visual Speech Synthesis", Sep. 1995, ESCA EUROSPEECH '95, 4$^{th}$ European Conference on Speech Communication and Technology, Madrid, 4 pages.
Huang, X., et al., "Whistler: A Trainable Text-to-Speech System", 1996, Proceedings of the 4$^{th}$ International Conference on Spoken Language Processing (ICSLP '96), Piscataway, New Jersey, 4 pages.
Huang, X, et al., "The SPHINX-II Speech Recognition System: An Overview", Jan. 15, 1992, School of Computer Science, Carnegie Mellon University, Pittsburgh, Pennsylvania, 14 pages.
Huggins, D., et al., "PoketSphinx: A Free, Real-time Continuous Speech Recognition System for Hand-Held Devices", 2006, IEEE, ICASSP 2006, 4 pages.
Rabiner, L., "A Tutorial on Hidden Markov Models and Selected Applications in Speech Recognition", Feb. 1989, Proceedings of the IEEE, 77(2):257-286.
Ravishankar, M., "Efficient Algorithms for Speech Recognition", May 15, 1996, Thesis, School of Computer Science, Carnegie Mellon University, Carnegie Mellon University, Pittsburgh, Pennsylvania, 146 pages.
Shannon, R., et al., "Speech Recognition with Primarily Temporal Cues", Oct. 13, 1995, *Science*, 270(5234): 303-304.
Sutton, S., "Universal Speech Tools: The CSLU Toolkit", Nov. 1998, Proceedings of the International Conference on Spoken Language Processing (ICSLP), pp. 3221-3224, Proceedings of the International Conference on Spoken Language Processing (ICSLP), Sydney, Australia, 4 pages.
Huang, X.D., et al., "Hidden Markov Models for Speech Recognition," Computational Linguistics, vol. 19, No. 1, pp. 217-218 (1990).

\* cited by examiner

VOICE TO TEXT TO VOICE PROCESSING

BACKGROUND

Oral communications can be complicated by strong accents, dialects, non-native speakers, language barriers, background noise, channel noise, slang, misuse of grammar, mismatch in vocabulary complexity, or any other such impairments. These complications may arise in mobile communication systems, call centers, customer service centers, emergency services, educational settings, or any other environments where listeners wish to perceive delivered oral communications with improved clarity.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
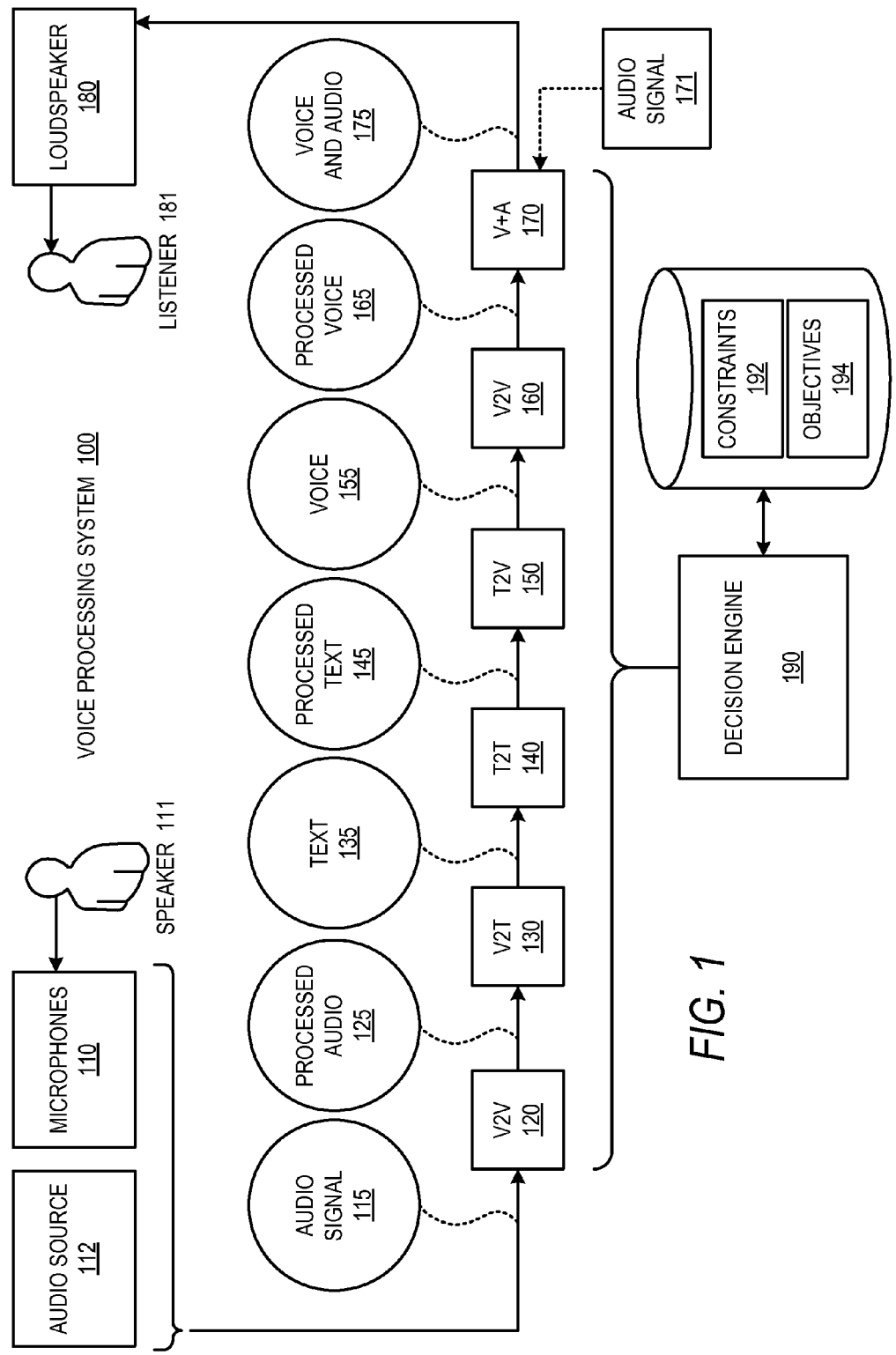
FIG. 1 is a block diagram illustrating a voice processing system having several stages of processing.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures, can be arranged, substituted, combined, separated, and designed in a wide variety of different configurations, all of which are explicitly contemplated herein.

This disclosure is drawn to methods, apparatus, systems and computer program products related to voice to text to voice processing. An audio signal comprising spoken voice can be processed such that the signal conforms to a set of specified constraints and objectives. The audio signal can be preprocessed and translated into text prior to being analyzed and reorganized in the textual domain. The resulting text can then be converted into a new voice format where additional processing may be conducted. The voice to text to voice processing may translate the voice content from a specific language to the same language with improved clarity, corrected grammar, adjusted vocabulary level, corrected slang, altered dialect, altered accent, or other modifications of oral communication characteristics. The processing may also include translation into one or more other languages from the original language.

The voice to text to voice processing may be integrated with techniques and infrastructures associated with electronic communication systems, human computer interfaces, the Internet, traditional telephone systems, and the World Wide Web. The voice to text to voice processing may improve human communications over both wired and wireless devices and infrastructure.

The voice to text to voice processing may consist of coordinated processing of audio signals, translation of audio signals into the text domain, and processing in the text domain for improved legibility, style, professional appearance, various other characteristics, or any combination thereof. The processed text may be translated back into the audio domain and then optionally followed by a final processing of the audio signal. The processing at each stage may be driven by a set of objectives and constraints set by the speaker, the listener, a third party, or any combination of the explicit or implicit participants. The objectives may be viewed as desired results. The constraints may be viewed as hardware or software constraints. The constraints may also be context or application specific. For example, a constraint may be placed on a public broadcast to remove or replace offensive words or phrases.

Turning now to FIG. 1, a block diagram illustrates a voice processing system 100 having several stages of processing according to one or more embodiments presented herein. A voice signal may be recorded using one or more microphones 110. The microphones 110 can be identical or unique. One or more of the microphones 110 can be subject to physical or digital filtering. The microphones 110 can seek to capture the voice of a speaker 111 along with any surrounding or ambient sounds.

The audio signal 115 from the microphones 110 or any other audio source 112 may continue to a voice to voice (V2V) processing stage 120. The V2V processing stage 120 may comprise audio domain preprocessing in either analog or digital signal space. The V2V processing stage 120 may process the audio signal 115 via filtering, time translation and other processing. For example, Fourier transform, fast Fourier transform (FFT), frequency domain, phase domain, time domain, spectrum, power spectrum, cepstrum, or any other analysis techniques can be use in the V2V processing stage 120. The V2V processing stage 120 may seek to remove noise, background noise, interference, parse multiple speakers, or various other audio domain issues.

Continuing to the voice to text (V2T) processing stage 130, the preprocessed audio signal 125 from the V2V processing stage 120 may be converted to text 135 using voice recognition technology. The V2T processing stage 130 can seek to improve legibility while attempting to reduce ambiguity. The V2T processing stage 130 may be performed using a generalized speech to text tool or by using a speaker-dependent speech to text tool. The speaker-dependent speech to text tool may be informed by a supervised, or non-supervised, training operation. A flexible, dynamic programming operation may also be used for the training and speech to text operations.

Continuing to the text to text (T2T) processing stage 140, the text 135 generated in the V2T processing stage 130 may be processed and thus transformed into processed text 145. The T2T processing stage 140 can implement a set of language objectives 194. Applications of the language objectives 194 may affect grammatical corrections, style improvements, deletion of censored words, expansion of acronyms, creation of acronyms, thesaurus-based substitution, text compression, ambiguity removal, ambiguity addition, content complexity adjustment, vocabulary level adjustment, language sophistication level adjustment, or any other such transformations. Semantic compression may be applied during or after the T2T processing stage 140.

The set of language objectives 194 may include removing censored terms. The censored terms may be provided as a list of terms not to be played as audio in a certain context. For example, offensive words may be specified as censored terms in movies, broadcast media, or educational materials. The set of language objectives 194 may include correcting linguistic ambiguities. The linguistic ambiguities may include the use of words or phrases having more than one meaning.

Continuing to the text to voice (T2V) processing stage 150, the processed text 145 from the T2T processing stage 140 may be transformed to voice 155. The T2V processing stage 150 can regenerate the voice recorded in audio signal 115 as a second audio signal 155 with a different gender, accent, pitch, intonation, cadence, or any other characteristic as specified by the particular T2V processing stage 150 selected for use in the system. The T2V processing stage 150 can regenerate the recorded voice characteristics with a replacement voice footprint specified by, or preferred by, either the listener 181 or the speaker 111.

Continuing to the voice to voice (V2V) processing stage 160, the voice audio signal 155 generated in the T2V processing stage 150 can be post-processed in the audio domain and thus transformed into a processed voice signal 165. This processing may occur in either analog or digital signal space. In the V2V processing stage 160, the voice audio may be processed in a time, frequency, phase, or otherwise transformed domain.

Continuing to the voice plus audio (V+A) processing stage 170, the post-processed audio 165 from the V2V processing stage 160 may have additional audio processing. The additional audio processing of the V+A processing stage 170 can be used to add additional audio content such as audio signal 171 to the processed voice signal 165 to generate a voice and audio signal 175. For example, background sounds, audience sounds, music, sound effects, or other additional audio may be added as the additional audio signal 175 at the V+A processing stage 170. The voice and additional audio signal 175 may be delivered from the V+A processing stage to one or more loudspeakers 180 for audition by one or more listeners 181.

Any of the processing stages 120-170 may be left out as optional according to specific applications or implementations of the voice processing system 100. The order of the processing stages 120-170 may be different according to specific applications of the voice processing system 100. Any of the processing stages 120-170 may be repeatedly applied either back to back or interleaved with any other of the processing stages 120-170 according to specific applications of the voice processing system 100.

Storage or transmission stages may be placed at or between any of the processing stages 120-170. A storage stage may store an audio, text, or otherwise coded representation of the signal being processed. The stored representation may be used at a later time or in a different location. A transmission stage may transmit an audio, text, or otherwise coded representation of the signal being processed. The transmitted representation may then be received at a different location. Portions of the processing stages 120-170 may occur before a storage or transmission stage. The same portions, or other portions, of the processing stages 120-170 may then occur after the storage or transmission stage. More than one storage stages, transmission stages, or a combination thereof may be distributed throughout the processing stages 120-170 of the voice processing system 100. Placing a transmit stage at or between stages where the signal is in the text domain may support a reduction of transmission costs, error, or delays due to the reduced bandwidth of text relative to the equivalent voice audio.

Each of the processing stages 120-170 can act to transform the input representation of a voice signal into an output representation of the voice signal according to specified constraints and objective functions. Each of the processing stages 120-170 may be supported by a database of collected data and statistical and heuristic models for speakers 111 and listeners 181. The order in which the processing stages 120-170 are executed may be determined using a decision engine. The specific operation or configurations of the processing stages 120-170 may be determined using a decision engine. Each of the processing stages 120-170 may be statistically, or otherwise, characterized to support optimizing, or substantially improving, system characteristics such as latency, throughput, power consumption, subjective audibility, as well as various other factors.

The voice processing system 100 can perform voice to text to voice processing in such a way that the resultant voice audio satisfies a specified set of constraints 192 and maximizes a specific objective function 194. A constraint 192 may be a rule or system limitation that must be applied. For example, forced removal of censored terms may be considered a constraint 192. Also, physical limitations on sampling rate or amplitude may be considered constraints 192. An objective 194, also referred to as an objective function 194, may be a desired result. For example, an average amplitude may be an objective function.

The constraints 192 and objective functions 194 can be specified by a user. The constraints 192 and objective functions 194 can be specified by one or more default configurations. The constraints 192 and objective functions 194 can be specified by a set of templates. The constraints 192 and objective functions 194 can be specified as marked examples. The marked examples may be generated by, or marked by, a user. The marked examples may be marked as positive examples to be emulated, or as negative examples to be avoided.

The constraints 192 and objective functions 194 can be specified such that processing has less than a specified latency limit. The constraints 192 and objective functions 194 can be specified such that processing has at least a specified throughput limit. The constraints 192 and objective functions 194 can be specified such that processing has at least a specified quality of service limit. The quality of service may be measured as a discrepancy function between the actual output voice data and predefined specifications.

The constraints 192 and objective functions 194 can be specified such that the resultant voice is superimposed on a deterministic or randomized user specified background audio data. The background audio data can be a simulated or prerecorded bad link or link failure to support the inference of a dropped call or noisy call. The constraints 192 and objective functions 194 can be specified such that the resultant voice has a background sound substantially removed. The constraints 192 and objective functions 194 can be specified such that the bandwidth for the signal transmission is reduced. The constraints 192 and objective functions 194 can be specified such that the resultant voice audio is similar to one or more specified samples. The constraints 192 and objective functions 194 can be specified such that the resultant voice audio is similar to audio generated by any of a group of teleconference participants.

The constraints 192 and objective functions 194 may be specified by one or more listeners 181 at the loudspeaker 180. One or more of the processing stages 120-170 may be performed in real-time. One or more of the processing stages 120-170 may be performed off-line. The level or content of actual background sounds recorded from the microphone 110 may be used to control the level or content of the additional audio signal 171 applied at the V+A processing stage 170.

The voice processing system 100, may be used entirely, or in part, in any number of applications. Some examples of these applications may include various application call centers, public announcements, medical services, guidance systems, telemarketing, emergency call handling, educational lectures, presentation applications, entertainment applications, medical diagnosis recording, radio, television, Internet news, commercial materials, artistic materials, sports, e-commerce, e-marketing, censorship, censorship avoidance, language translation, placement of advertisements, loudspeaker announcements, lectures and other presentations in front of an audience, exhibition, conference presentation, and convention presentations. In one entertainment application, one or more audio post processing operations using the V2V processing stage 160 may be associated with the playback of a video, movie, or television program according to the specifications of the director or other development personal.

The constraints 192 and objective functions 194 can be specified for use in capturing lectures or other presentations using single or multiple distributed microphones. The constraints 192 and objective functions 194 can be specified for use in the operation of call centers where one or more of the processing stages 120-170 may be applied to voice signals generated by call center personnel. The constraints 192 and objective functions 194 can be specified for use in the operation of call centers where one or more of the processing stages 120-170 may be applied to voice signals generated by call center customers. Text generated by the V2T processing stage 130 or the T2T processing stage 140 may be displayed to a speaker or a listener. Such a display of text may support closed caption applications or other services for captions, subtitles, or the hearing impaired.

Figure 2:
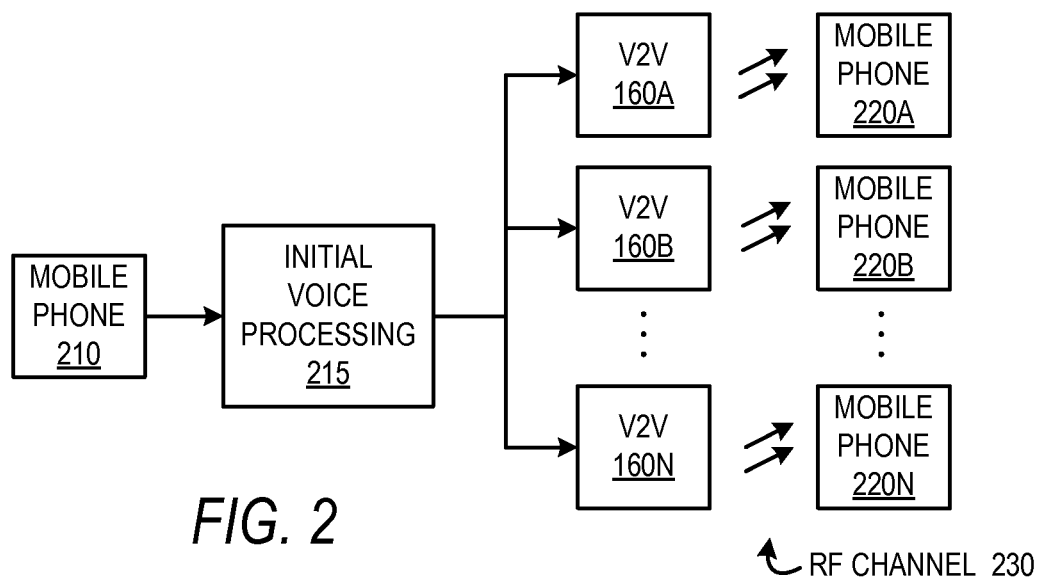
FIG. 2 is a block diagram illustrating a mobile communications system where a post-processing stage occurs prior to transmission over a radio frequency channel.

Turning now to FIG. 2, a block diagram illustrates a mobile communications system 200 where a post-processing stage 160A-160N occurs prior to transmission over a radio frequency channel 230 according to some embodiments presented herein. A single mobile telephone 210 can communicate to a plurality of mobile telephones 220A-220N. The communication from the single mobile telephone 210 to the plurality of mobile telephones 220A-220N may occur over the radio frequency (RF) channel 230.

Processing of the voice signal from the single mobile telephone 210 may employ any or all of the voice processing stages 120-170 in any combination. In particular, the voice processing of the audio signal from the single mobile telephone 210 can include an initial voice processing 215 followed by a V2V processing stage 160A-160N. The initial voice processing 215 may comprise any or all of the voice processing stages 120-150. The V2V processing stage 160A-160N may be associated with each respective one of the plurality of mobile telephones 220A-220N. The V2V processing stage 160A-160N can perform post processing of the recovered voice audio signal in the audio domain. The V2V processing stage 160A-160N can be in either the analog or digital domain.

Each of the respective V2V processing stages 160A-160N may be customized according to desired characteristics for the received audio signal at the corresponding mobile telephone 220A-220N. The V2V processing stages 160A-160N may all be identical or they may be individually customized according to each of the receiving mobile telephones 220A-220N. For example, V2V processing stage 160A may be adjusted to increase the amplitude of the audio signal, where the listener associated with the mobile telephone 220A is hearing impaired. The respective V2V processing stages 160A-160N may be specified by a central carrier such as the mobile telephone system provider. The V2V processing stages 160A-160N may also be specified by an operator of the source mobile telephone 210. Alternatively, each of the respective V2V processing stages 160A-160N may be individually specified by a listener or user associated with the corresponding mobile telephone 220A-220N.

The voice processing, such as the initial voice processing 215 or the V2V processing stage 160A-160N may be performed, all or in part, at the mobile telephone 210 or at a base station associated with mobile telephone 210. The voice processing system 100 can translate voice data to text and back to voice data in such a way that the resulting voice signal satisfies a specified set of constraints and seeks to maximize a specified objective function. The constraints 192 and objective functions 194 may be defined such that multiple different resultant voice audio versions are produced for different multicast or teleconference participants such as mobile phones 220A-220N. The constraints 192 and objective functions 194 may be defined such that the source voice is translated in a specific way according to the last speaker or the last k speakers, for some specified number k. The source voice may be, in one example, associated with the single mobile telephone 210.

It should be appreciated that the RF channel 230 may also be any other communication channel. A communication channel may support the transmission of a signal from a transmitter or source to a receiver or destination. For example, communication channels may include an air gap for audio transmission, a wireless link, an RF link, a wired link, a satellite link, a network, a telephone system, a cellular system, an optical link, an optical fiber, or any other such mechanism for conducting signals. The signals may be electrical, electromagnetic, optical, audio waves, or any other mechanism for representing information in an analog or digital coded format.

Figure 3:
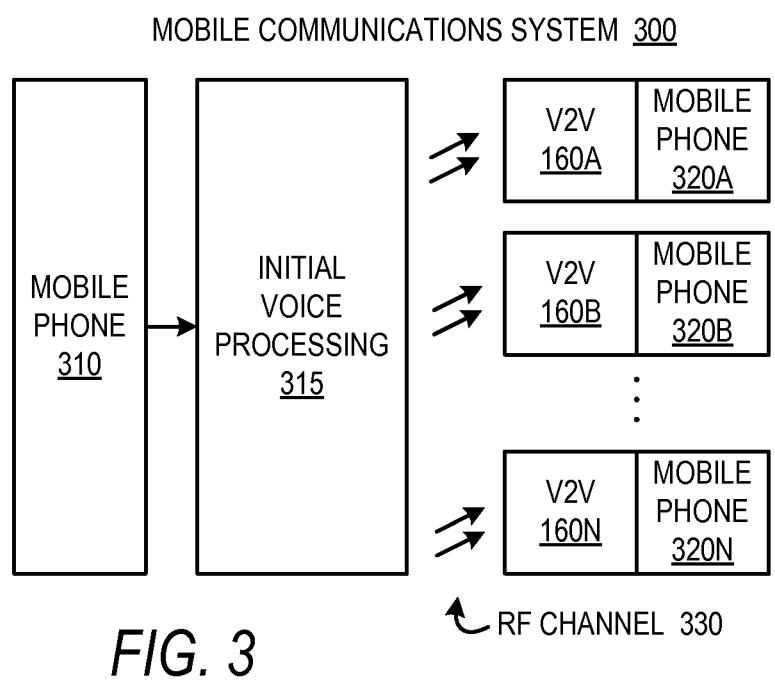
FIG. 3 is a block diagram illustrating a mobile communications system where a post-processing stage occurs subsequent to transmission over a radio frequency channel.

Turning now to FIG. 3, a block diagram illustrating a mobile communications system 300 where a post-processing stage 160A-160N occurs subsequent to transmission over a radio frequency channel 330 according to one or more embodiments presented herein. A single mobile telephone 310 can communicate to a plurality of mobile telephones 320A-320N. The communication from the single mobile telephone 310 to the plurality of mobile telephones 320A-320N may occur over the radio frequency (RF) channel 330.

Processing of the voice signal from the single mobile telephone 310 may employ any or all of the voice processing stages 120-170 in any combination. In particular, the voice processing of the audio signal from the single mobile telephone 310 can include an initial voice processing 315 and a V2V processing stage 160A-160N. The initial voice processing 315 may comprise any or all of the voice processing stages 120-150. The V2V processing stage 160A-160N may be associated with each respective one of the plurality of mobile telephones 320A-320N. The V2V processing stage 160A-160N can perform post processing of the recovered voice audio signal in the audio domain. The V2V processing stage, 160A-160N, can be in either the analog or digital domain.

Each of the respective V2V processing stages 160A-160N may be customized according to desired characteristics for the received audio signal at the corresponding mobile telephone 320A-320N. The V2V processing stages 160A-160N may all be identical or they may be individually customized according to each of the receiving mobile telephones 320A-320N. For example, V2V processing stage 160A may be adjusted to increase the amplitude of the audio signal, where the listener associated with the mobile telephone 320A is hearing impaired. The respective V2V processing stages 160A-160N may be specified by a central carrier such as the mobile telephone system provider. The V2V processing stages 160A-160N may also be specified by an operator of the source mobile telephone 310. Alternatively, each of the respective V2V processing stages 160A-160N may be individually specified by a listener or user associated with the corresponding mobile telephone 320A-320N.

The voice processing, such as V2V processing stage 160A-160N may be performed, all or in part, at each of the mobile telephones 320A-320N or at one or more base stations associated with the mobile telephones 320A-320N. The voice processing system 100 can translate voice data to text and back to voice data in such a way that the resulting voice signal satisfies a specified set of constraints and seeks to maximize a specified objective function. The constraints 192 and objective functions 194 may be defined such that multiple different resultant voice audio versions are produced for different multicast or teleconference participants such as mobile phones 320A-320N. The constraints 192 and objective functions 194 may be defined such that the source voice is translated in a specific way according to the last speaker or the last k speakers, for some specified number k. The source voice may be, in one example, associated with the single mobile telephone 310.

Figure 4:
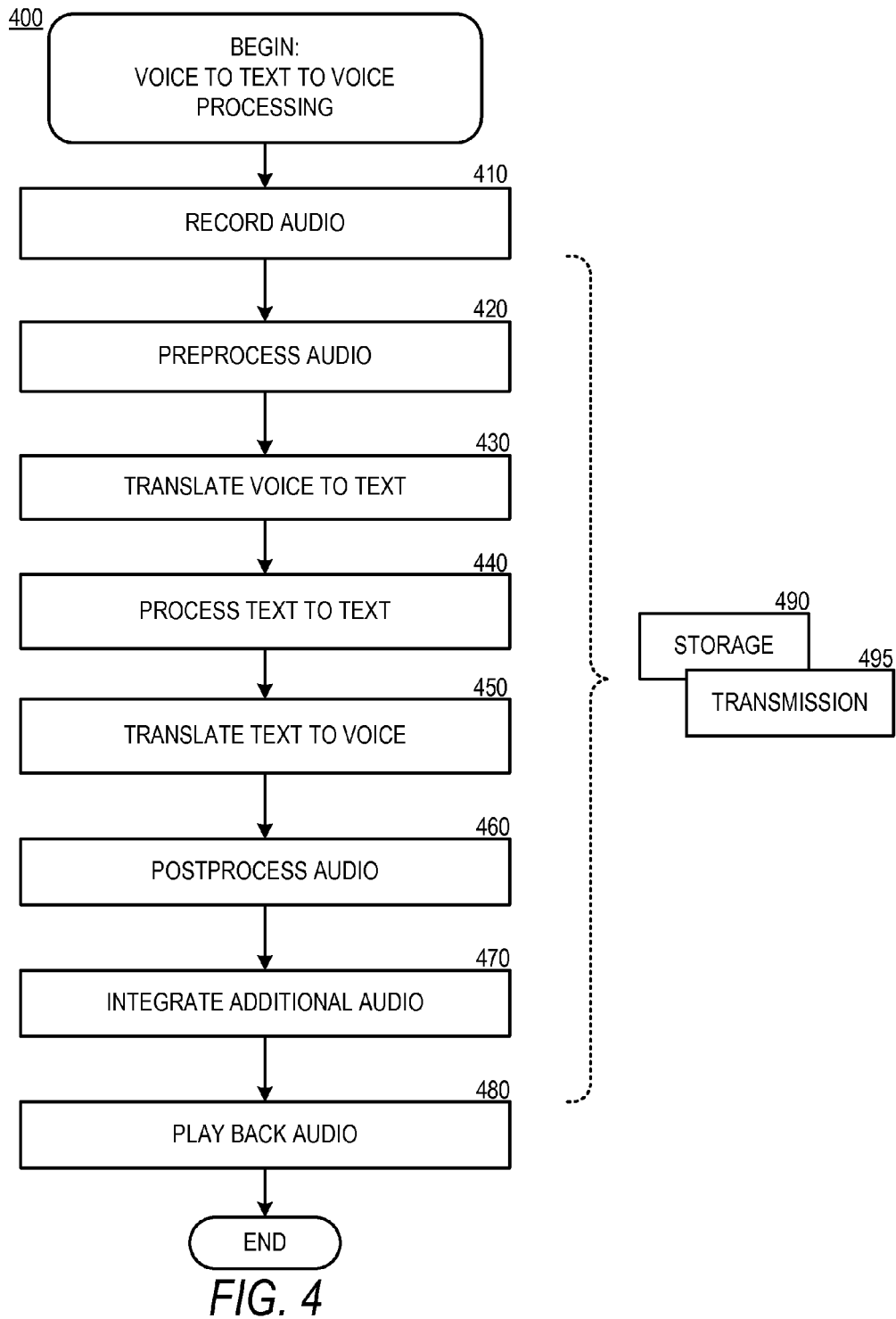
FIG. 4 is a flow diagram illustrating a process for voice to text to voice processing.

Referring now to FIG. 4, additional details will be provided regarding the embodiments presented herein for multistage voice processing. In particular, FIG. 4 is a flow diagram illustrating a process 400 for voice to text to voice processing according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The process 400 begins at operation 410, where audio can be recorded using one or more microphones 110 or collected from any other audio source 112. Continuing to operation 420, audio preprocessing may be performed using a V2V processing stage 120. The V2V processing stage 120 may perform audio domain processing in either the analog or digital signal space. The V2V processing stage 120 may filter, time shift, transform, or otherwise process the audio signal 115 recorded in operation 410.

Continuing to operation 430, the preprocessed audio signal 125 from operation 420 may be translated from voice to text 135 by a V2T processing stage 130. The V2T processing stage 130 may perform a generalized speech to text operation or may convert speech to text using a speaker dependent mechanism. The speaker dependent mechanism may be informed by a training operation. The training operation may involve a supervised or non-supervised training sequence.

Continuing to operation 440, text domain processing may be performed by a T2T processing stage 140. The T2T processing stage 140 can attempt to correct grammar, improve style, delete censored words, expand acronyms, create acronyms, substitute from a thesaurus, compress text, remove ambiguities, add ambiguities, adjust content complexity, or make any number of other adjustments in the text domain representation obtained from operation 430.

Continuing to operation 450, the processed text 145 from operation 440 may be translated from text to voice 155 by a T2V processing stage 150. The T2V processing stage 150 can regenerate an audio voice signal 155 from text 135,145 that was derived from an original recorded audio signal. The T2V processing stage 150 can convert the text to a voice audio signal using a specified gender, accent, pitch, intonation, cadence, or any other voice characteristics. These specified voice characteristics may be independent from any related voice characteristics of the original recorded audio 115 from operation 410.

Continuing to operation 460, the recovered voice audio 155 generated in operation 450 may be post processed by a V2V processing stage 160. The V2V processing stage 160 can operate on the voice signal in the audio domain. The processing may be in either an analog or digital signal space. The V2V processing stage 160 may process the audio signal 155 in the time domain, frequency domain, phase domain, or any other transformed domain.

Continuing to operation 470, the post processed audio 165 from operation 460 may be integrated with additional audio 171 in a V+A processing stage 170. The V+A processing stage 170 can be used to add additional audio content to the audio signal. For example, background sounds, audience sounds, music sound effects, laugh tracks, or any other additional audio may be processed into the voice signal at the V+A processing stage 170.

Continuing to operation 480, the audio signal 165, 175 generated from operation 460 or operation 470 may be played back as an audible signal at one or more loudspeakers 180. The audio energy generated at the one or more loudspeakers 180 may be auditioned by one or more listeners 181.

A storage operation 490 or a transmission operation 495 may be placed at or between any of operations 410-480. A storage operation 490 may store an audio, text, or otherwise coded representation of the voice signal being processed for use at a latter time or in a different location. A transmission operation 495 may transmit an audio, text, or otherwise coded representation of the voice signal being processed for receipt at a different location by a receiver.

Figure 5:
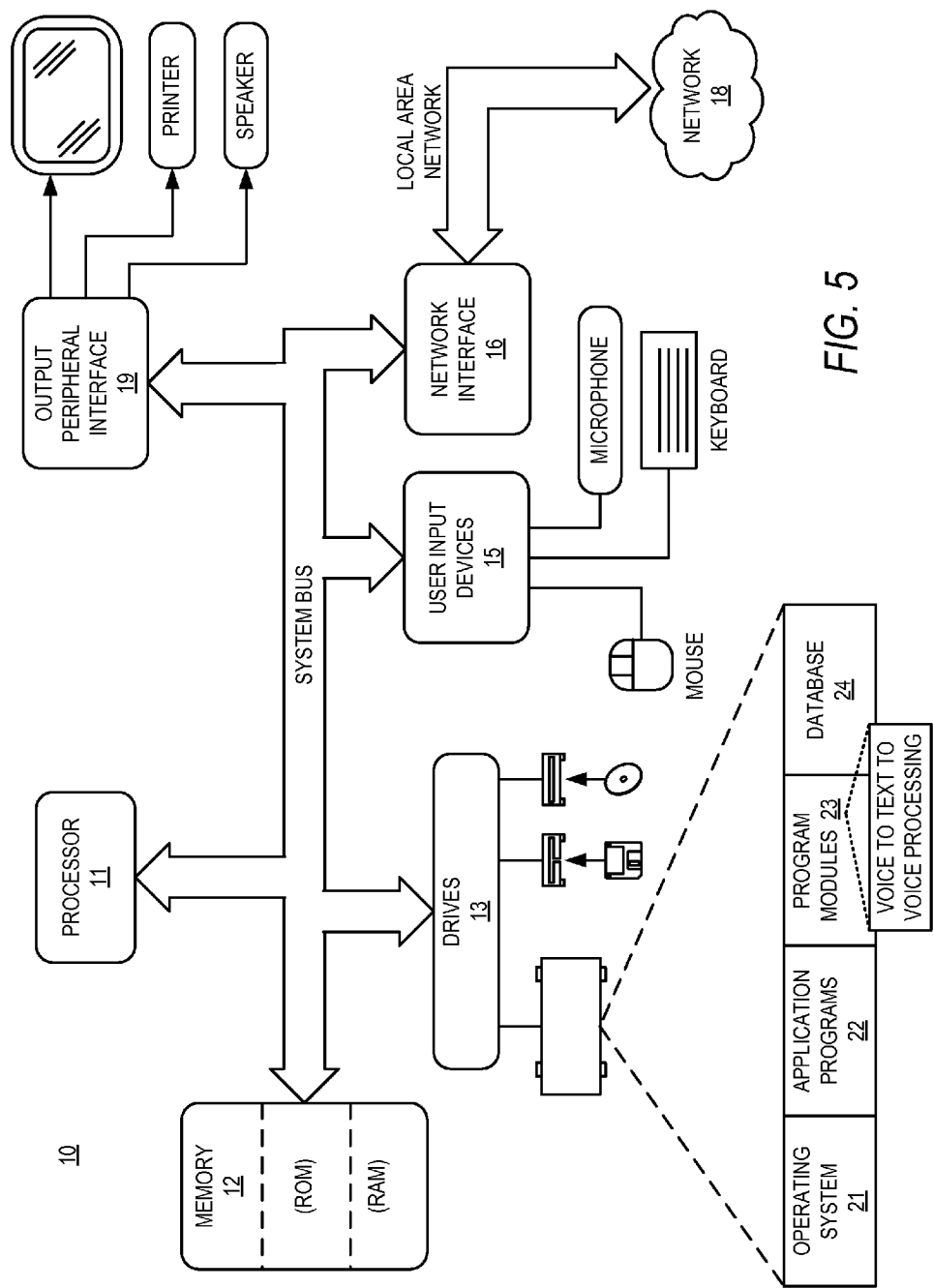
FIG. 5 is a block diagram illustrating an exemplary computing system, all arranged according to embodiments presented herein.

With reference to FIG. 5, an exemplary computing system is illustrated for implementing various embodiments. The computing system can support embodiments for implementing the voice processing stages 120-170 of the voice processing system 100. Various embodiments may include computers, dedicated hardware, or embedded computing systems. For example, elements of the illustrated computing system may be embedded into mobile phones 210, 310, 220A-220N, and 320A-320N. The computing system includes a computer 10. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The drives 13, other storage devices, or their associated computer-readable storage media can store an operating system 21, application programs 22, program modules 23, and a database 24. The computer 10 can include user input devices 15 through which a user may enter commands and data. Input devices can include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices can be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer can include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 can include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 can perform voice to text to voice processing in accordance with embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23. The program modules 23 may include software instructions that, when loaded into the processor 11 and executed, transform a general-purpose computing system into a special-purpose computing system customized to facilitate all, or part of, the voice to text to voice processing techniques disclosed herein. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support voice to text to voice processing. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

What is claimed is:

1. A non-transitory computer-readable storage medium having computer-executable instructions stored thereon that configure the computer to:
   use a decision engine to select processing stages to transform an input representation of voice signals into an output representation of text language representations according to a set of context-specific constraints, a set of application specific constraints, objective functions, and a determination of an order of the processing stages, wherein the processing stages include one or more voice-to-text processing stages and one or more text-to-text processing stages;
   process a first voice audio signal based on the application specific constraints;
   extract a first text language representation from the first voice audio signal based on the set of the context-specific constraints and the set of application specific constraints;
   transform the first text language representation into a second text language representation according to a set of language objectives, the set of context-specific constraints, and the set of the application specific constraints;
remove censored words and ambiguities from the second text language representation according to rules of the application specific constraints;
generate a second audio signal from the second text language representation,
  wherein the second audio signal includes voice characteristics that differ from the first audio signal, and
  wherein the voice characteristics include a gender, a pitch, an intonation, an accent, and a cadence;
post-process the second audio signal;
integrate the second audio signal with one or more other audio signals; and
transmit the second audio signal to a computing device.

2. The computer-readable storage medium of claim 1, wherein the set of language objectives includes one of: a specification to remove linguistic ambiguities in textual content associated with the first text language representation, a specification for thesaurus-based word substitution in the textual content associated with the first text language representation, and a specification to expand acronyms in the textual content associated with the first text language representation.

3. A method executed on a computing device to process a voice, the method comprising:
using a decision engine to determine an order of processing stages to transform an input representation of voice signals into an output representation of text language representations according to a set of context-specific constraints, a set of application specific constraints, objective functions, and a determination of an order of the processing stages, wherein the processing stages include one or more voice-to-text processing stages and one or more text-to-text processing stages;
processing a first voice audio signal at a computer based on the application specific constraints;
transforming the first voice audio signal into a first text language representation of the first voice audio signal based on the set of context-specific constraints and the set of application specific constraints by way of the computer;
transforming the first text language representation into a second text language representation according to a set of language objectives, the set of context-specific constraints, and the set of application specific constraints by way of the computer;
removing censored words and ambiguities from the second text language representation according to rules of the application specific constraints;
generating a second audio signal from the second text language representation,
  wherein the second audio signal includes voice characteristics that differ from the first audio signal, and
  wherein the voice characteristics include a gender, a pitch, an intonation, an accent, and a cadence;
post-process the second audio signal;
post-processing the second audio signal;
integrating the second audio signal with one or more other audio signals; and
transmitting the second audio signal to another computing device.

4. The method of claim 3, wherein transforming the first voice audio signal into the first text language representation comprises performing speech recognition operations trained to a set of voice characteristics associated with the first voice audio signal.

5. A voice processing system comprising:
a processing unit;
a memory to store an audio signal; and
a processing module configured to:
  determine an order of processing stages to transform an input representation of voice signals into an output representation of text language representations according to a set of context-specific constraints, a set of application specific constraints, objective functions, and a determination of an order of the processing stages, wherein the processing stages include one or more voice-to-text processing stages and one or more text-to-text processing stages;
  process a first voice audio signal based on the application specific constraints;
  extract a first text language representation from the first voice audio signal based on the set of the context-specific constraints and the set of application specific constraints;
  transform the first text language representation into a second text language representation according to a set of language objectives, the set of context-specific constraints, and the set of application specific constraints;
  remove censored words and ambiguities from the second text language representation according to rules of the application specific constraints;
  generate a second audio signal from the second text language representation,
    wherein the second audio signal includes voice characteristics that differ from the first audio signal, and
    wherein the voice characteristics include a gender, a pitch, an intonation, an accent, and a cadence;
  post-process the second audio signal;
  integrate the second audio signal with one or more other audio signals; and
  transmit the second audio signal to a computing device.

6. The voice processing system of claim 5, wherein transforming the first voice audio signal into the first text language representation comprises a performance of speech recognition operations trained to a set of voice characteristics associated with the first voice audio signal.

7. The voice processing system of claim 5, further comprising a storage medium, wherein the processing module is further configured to support time-shifting by storing the first text language representation of the first voice audio signal onto the storage medium at a first time, and transforming the first text language representation into the second text language representation according to the set of language objectives, the set of application specific constraints, and the set of context-specific constraints at a second time.

* * * * *